United States Patent
Roman

(10) Patent No.: US 11,703,047 B2
(45) Date of Patent: Jul. 18, 2023

(54) BELLOWS PRESSURE RELIEF VALVE

(71) Applicant: Graco Minnesota Inc., Minneapolis, MN (US)

(72) Inventor: Timothy S. Roman, Minnetonka, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 70 days.

(21) Appl. No.: 17/204,593

(22) Filed: Mar. 17, 2021

(65) Prior Publication Data

US 2021/0199102 A1    Jul. 1, 2021

Related U.S. Application Data

(63) Continuation of application No. 15/381,772, filed on Dec. 16, 2016, now Pat. No. 10,982,665.

(Continued)

(51) Int. Cl.
*F04B 53/10* (2006.01)
*F04B 39/04* (2006.01)
(Continued)

(52) U.S. Cl.
CPC ........ *F04B 53/1005* (2013.01); *F04B 39/047* (2013.01); *F04B 43/084* (2013.01);
(Continued)

(58) Field of Classification Search
CPC ...... F04B 19/22; F04B 39/047; F04B 43/084; F04B 53/1005; F04B 53/1002–1012; F04B 53/108; F16K 15/042; F16K 15/1823; F16K 15/1843; F16K 17/048; F16K 24/046
(Continued)

(56) References Cited

U.S. PATENT DOCUMENTS

| 326,941 A | 9/1885 | Beowne |
| 429,611 A | 6/1890 | Facer |

(Continued)

FOREIGN PATENT DOCUMENTS

| CN | 2608720 Y | 3/2004 |
| CN | 1494403 A | 5/2004 |

(Continued)

OTHER PUBLICATIONS

First Chinese Office Action for CN Application No. 2016800742259, dated Feb. 25, 2019, pp. 10.

(Continued)

*Primary Examiner* — Alexander B Comley
(74) *Attorney, Agent, or Firm* — Kinney & Lange, P.A.

(57) ABSTRACT

A valve for a reciprocating pump includes a housing, a first chamber, a second chamber, a first valve element, and a second valve element. The housing includes an inlet and an outlet. The first and second chambers are within the housing. The first chamber includes a first valve seat and is fluidly connected to the inlet. The second chamber includes a second valve seat and is fluidly connected to the outlet. The first valve element is disposed in the first chamber and includes a spring-loaded check valve element. The second valve element is disposed in the second chamber and includes a buoyant material.

12 Claims, 11 Drawing Sheets

Related U.S. Application Data

(60) Provisional application No. 62/269,436, filed on Dec. 18, 2015.

(51) Int. Cl.
*F04B 43/08* (2006.01)
*F04B 53/14* (2006.01)
*F16K 15/04* (2006.01)
*F04B 19/22* (2006.01)
*F16K 17/04* (2006.01)

(52) U.S. Cl.
CPC .......... *F04B 53/1002* (2013.01); *F04B 19/22* (2013.01); *F04B 53/143* (2013.01); *F16K 15/044* (2013.01); *F16K 17/0406* (2013.01); *F16K 17/048* (2013.01)

(58) Field of Classification Search
USPC .................................................. 137/197–202
See application file for complete search history.

(56) References Cited

U.S. PATENT DOCUMENTS

| | | | |
|---|---|---|---|
| 679,343 A | 7/1901 | Singer | |
| 1,381,155 A | 6/1921 | Wood | |
| 1,481,078 A | 1/1924 | Albertson | |
| 1,546,706 A | 7/1925 | Bezzenberger | |
| 1,724,878 A | 8/1929 | Jensen | |
| 1,893,942 A | 1/1933 | Jensen | |
| 2,103,057 A | 12/1937 | Blumer | |
| 2,105,864 A | 1/1938 | Saunders | |
| 2,245,648 A | 6/1941 | Campbell | |
| 2,734,667 A * | 2/1956 | Conklin | F04B 53/126 222/207 |
| 2,912,867 A | 11/1959 | Gallant | |
| 2,915,563 A | 12/1959 | Fischer | |
| 2,919,707 A | 1/1960 | Seidler | |
| 2,985,359 A | 5/1961 | Hanje | |
| 3,087,944 A | 4/1963 | Rubin | |
| 3,092,821 A | 6/1963 | Muehlner | |
| 3,106,099 A | 10/1963 | Jeffrey et al. | |
| 3,130,963 A | 4/1964 | Stegner | |
| 3,407,827 A | 10/1968 | Follett | |
| 3,415,159 A | 12/1968 | Hornlein et al. | |
| 3,473,347 A | 10/1969 | Andrews et al. | |
| 3,480,285 A | 11/1969 | Anderson | |
| 3,645,649 A | 2/1972 | Beale | |
| 3,674,061 A * | 7/1972 | Calisher | F16L 37/34 248/908 |
| 3,905,278 A | 9/1975 | Ourdouillie | |
| 4,009,971 A | 3/1977 | Krohn et al. | |
| 4,170,166 A | 10/1979 | Reed | |
| 4,178,833 A | 12/1979 | Miller | |
| 4,240,386 A | 12/1980 | Crist | |
| 4,325,398 A * | 4/1982 | Green | F16K 17/366 137/39 |
| 4,331,283 A | 5/1982 | Fraser | |
| 4,418,656 A | 12/1983 | Stanton | |
| 4,421,999 A | 12/1983 | Beavers et al. | |
| 4,433,966 A | 2/1984 | Krumm | |
| 4,436,494 A * | 3/1984 | Yamaizumi | F04B 53/122 417/511 |
| 4,457,325 A * | 7/1984 | Green | B60K 15/03519 137/39 |
| 4,487,215 A * | 12/1984 | Green | F16K 17/366 137/39 |
| 4,524,794 A * | 6/1985 | Haines | F16K 24/046 137/423 |
| 4,556,369 A | 12/1985 | Braun | |
| 4,597,322 A | 7/1986 | Gamjost et al. | |
| 4,944,606 A | 7/1990 | Lindsey et al. | |
| 4,975,027 A | 12/1990 | Halverson et al. | |
| 4,986,727 A | 1/1991 | Blanton | |
| 5,029,401 A | 7/1991 | Masom | |
| 5,042,519 A * | 8/1991 | Kerlin | B60K 15/03519 137/202 |
| 5,058,861 A | 10/1991 | Baumann | |
| 5,061,159 A * | 10/1991 | Pryor | F04B 53/12 417/454 |
| 5,141,412 A | 8/1992 | Meinz | |
| 5,178,304 A | 1/1993 | Torterotot | |
| 5,317,955 A | 6/1994 | Raser | |
| 5,375,567 A | 12/1994 | Lowi | |
| 5,410,947 A | 5/1995 | Gamjost | |
| 5,415,531 A | 5/1995 | Cavanaugh | |
| 5,525,047 A | 6/1996 | Stemenberg et al. | |
| 5,558,506 A | 9/1996 | Simmons et al. | |
| 5,655,778 A | 8/1997 | Cavanaugh | |
| 6,129,526 A | 10/2000 | Kelly | |
| 6,157,103 A | 12/2000 | Ohta et al. | |
| 6,299,413 B1 | 10/2001 | Stahlman et al. | |
| 6,422,542 B2 | 7/2002 | Gramss | |
| 6,481,455 B2 | 11/2002 | Gustafson et al. | |
| 7,568,493 B2 | 8/2009 | Keefer et al. | |
| 7,762,273 B2 * | 7/2010 | Bottura | F16K 24/042 137/197 |
| 8,632,322 B2 | 1/2014 | Able et al. | |
| 9,016,303 B2 | 4/2015 | Hamza et al. | |
| 9,016,527 B2 * | 4/2015 | Faneca | B05B 11/3049 222/321.2 |
| 2002/0123705 A1 | 9/2002 | Reinecke et al. | |
| 2002/0162447 A1 | 11/2002 | Engelke et al. | |
| 2003/0198561 A1 | 10/2003 | Watanabe et al. | |
| 2005/0151370 A1 | 7/2005 | Vyse et al. | |
| 2005/0179216 A1 | 8/2005 | Neviani | |
| 2006/0082069 A1 | 4/2006 | Malavazi | |
| 2006/0283505 A1 * | 12/2006 | Makowan | F16K 24/046 137/388 |
| 2007/0166174 A1 | 7/2007 | Marriott et al. | |
| 2007/0178000 A1 * | 8/2007 | Able | F04B 53/122 417/472 |
| 2007/0267064 A1 | 11/2007 | Greene et al. | |
| 2008/0152515 A1 | 6/2008 | Karg et al. | |
| 2009/0000675 A1 * | 1/2009 | Baros | F16K 15/04 137/538 |
| 2009/0169398 A1 * | 7/2009 | Sellas | F04B 43/0081 417/505 |
| 2009/0255400 A1 | 10/2009 | Fish | |
| 2009/0269226 A1 | 10/2009 | De Minco et al. | |
| 2010/0209269 A1 | 8/2010 | Solera | |
| 2010/0251988 A1 | 10/2010 | Dauphin | |
| 2013/0039788 A1 | 2/2013 | Roman et al. | |
| 2013/0319916 A1 * | 12/2013 | Hamza | E04H 4/14 210/90 |
| 2014/0169993 A1 | 6/2014 | Berzak et al. | |
| 2016/0008834 A1 | 1/2016 | Brudevold et al. | |
| 2016/0146370 A1 * | 5/2016 | Kelly | F16K 27/0245 137/202 |

FOREIGN PATENT DOCUMENTS

| | | | |
|---|---|---|---|
| CN | 201246503 Y | | 5/2009 |
| CN | 102859192 A | | 1/2013 |
| EP | 879961 A1 | | 11/1998 |
| EP | 2177792 A1 | | 4/2010 |
| JP | 50110802 U | | 9/1975 |
| JP | 57015171 A | * | 1/1982 |
| JP | 57015171 A | | 1/1982 |
| JP | 57157078 A | | 9/1982 |
| JP | 06047727 U | | 6/1994 |
| WO | 9406600 A1 | | 3/1994 |
| WO | 2009147773 A1 | | 12/2009 |
| WO | 2010081008 A9 | | 10/2010 |
| WO | 2011137145 A1 | | 11/2011 |

OTHER PUBLICATIONS

First Chinese Office Action for CN Application No. 201680073938. 3, dated Jan. 2019, pp. 17.
First Chinese Office Action for CN Application No. 201680072555. 4, dated Jan. 22, 2019, pp. 20.

(56) References Cited

OTHER PUBLICATIONS

Second Chinese Office Action for CN Application No. 201680074225.9, dated Oct. 9, 2019, pp. 24.
Second Chinese Office Action for CN Application No. 201680073938.3, dated Sep. 23, 2019, pp. 28.
Second Chinese Office Action for CN Application No. 201680073540.X, dated Nov. 4, 2020, pp. 6.
Third Chinese Office Action for CN Application No. 201680073938.3, dated May 25, 2020, pp. 11.
Communication Pursuant to Article 94(3) EPC for EP Application No. 16876786.1, dated Oct. 18, 2019, pp. 8.
Communication Pursuant to Article 94(3) EPC for EP Application No. 16876782.0, dated Jul. 24, 2019, pp. 3.
Communication Pursuant to Article 94(3) EPC for EP Application No. 16876790.3, dated Oct. 2, 2019, pp. 8.
Extended European Search Report for EP Application No. 16876782.0, dated Dec. 14, 2018, pp. 10.
Extended European Search Report for EP Application No. 16876786.1, dated Feb. 1, 2019, pp. 7.
Extended European Search Report for EP Application No. 16876790.3, dated Feb. 1, 2019, pp. 7.
International Search Report and Written Opinion for PCT Application No. PCT/US2016/067210, dated Apr. 14, 2017, pp. 15.
International Search Report and Written Opinion for PCT Application No. PCT/US2016/067216, dated Apr. 14, 2017, pp. 15.
International Search Report and Written Opinion for PCT Application No. PCT/US2016/067226, dated Apr. 14, 2017, pp. 14.
First Japanese Office Action for JP Application No. 2018-530722, dated Oct. 28, 2020, pp. 8.
First Japanese Office Action for JP Application No. 2018-530721, dated Oct. 28, 2020, pp. 7.
First Japanese Office Action for JP Applictaion No. 2018-531484, dated Oct. 28, 2020, pp. 7.
International Search Report and Written Opinion for Application Serial No. PCT/US2016/067221, dated Apr. 21, 2017, 13 pages.
First Office Action from Chinese Patent Application No. 201680073540.X, dated Feb. 26, 2019, 16 pages.
Extended European Search Report for EP Application No. 16876788.7, dated Apr. 10, 2019, pp. 8 pages.
Japanese Office Action from JP Application No. 2018-531495, dated Oct. 28, 2020, 7 pages.

* cited by examiner ure relief valve.

BELLOWS PRESSURE RELIEF VALVE

CROSS-REFERENCE TO RELATED APPLICATION

This is a continuation application of U.S. application Ser. No. 15/381,772, filed Dec. 16, 2016, and entitled BELLOWS PRESSURE RELIEF VALVE" which claims priority to U.S. Provisional Application No. 62/269,436 filed on Dec. 18, 2015, and entitled "BELLOWS PRESSURE RELIEF VALVE," the entire contents of which are hereby incorporated by reference in their entirety.

BACKGROUND

The present disclosure relates to reciprocating pumps, and more particularly, to reciprocating pumps with a bellows seal.

In reciprocating pumps, bellows are utilized to create a non-sliding seal to prevent exposure of the working fluid to outside air. To prevent unwanted fluid leaks, a backup seal is employed to seal the shaft enclosed by the bellows. However, the backup seal seals the back of the bellows and does not allow the bellows to breathe as the bellows expands and contracts which can cause cycle fatigue and deformation in the bellows. If a simple breather hole with a screen or mesh is put between the bellows and backup seal, the volume of working fluid expelled may be reduced, but air would be ingested and the pump will no longer continue to operate in the event of a bellows rupture.

SUMMARY

A valve for a reciprocating pump includes a housing, a first chamber, a second chamber, a first valve element, and a second valve element. The housing includes an inlet and an outlet. The first and second chambers are within the housing. The first chamber includes a first valve seat and is fluidly connected to the inlet. The second chamber includes a second valve seat and is fluidly connected to the outlet and the first chamber. The first valve element is disposed in the first chamber and includes a spring-loaded check valve element. The second valve element is disposed in the second chamber and includes a buoyant material.

A reciprocating pump includes a first housing, a rod, a bellows, an endcap, a valve attached to the endcap, and a passage in the endcap. The first housing surrounds a bellows chamber and a displacement chamber. The rod extends into the reciprocating pump. The bellows is connected to the rod and to the first housing and includes an interior. The endcap is disposed on an end of the first housing. The rod extends through the endcap. The valve includes a second housing, a first chamber, a second chamber, a first valve element, and a second valve element. The second housing includes an inlet and an outlet. The first and second chambers are within the second housing. The first chamber includes a first valve seat and is fluidly connected to the inlet. The second chamber includes a second valve seat and is fluidly connected to the outlet and the first chamber. The first valve element is disposed the first chamber and includes a spring-loaded check valve element. The second valve element is disposed in the second chamber and includes a buoyant material. The passage fluidly connects the interior of the bellows to the valve.

DETAILED DESCRIPTION

Figure 1:
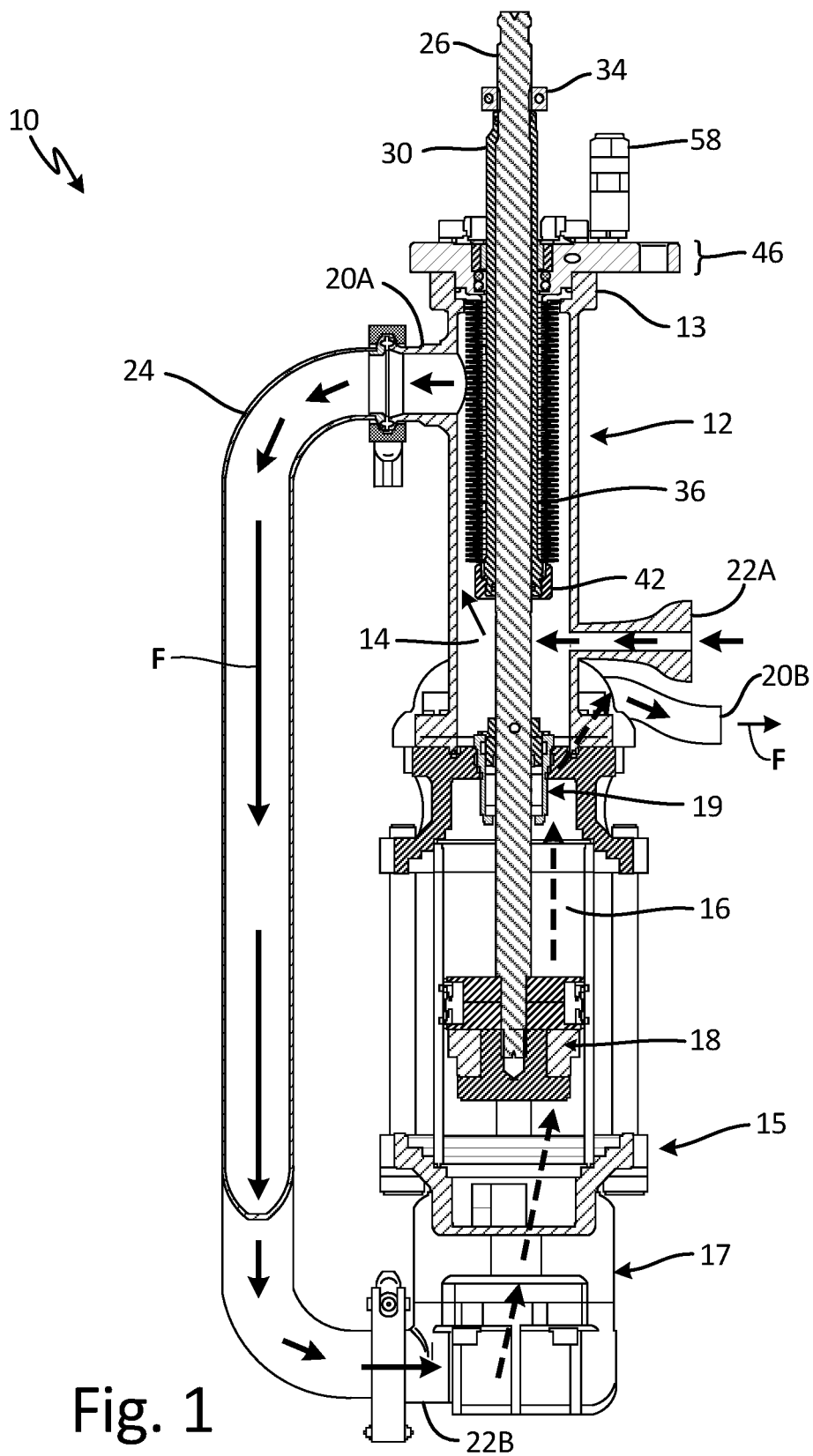
FIG. 1 is a cross-section view of a reciprocating pump with a bellows and a relief valve.
Figure 2:
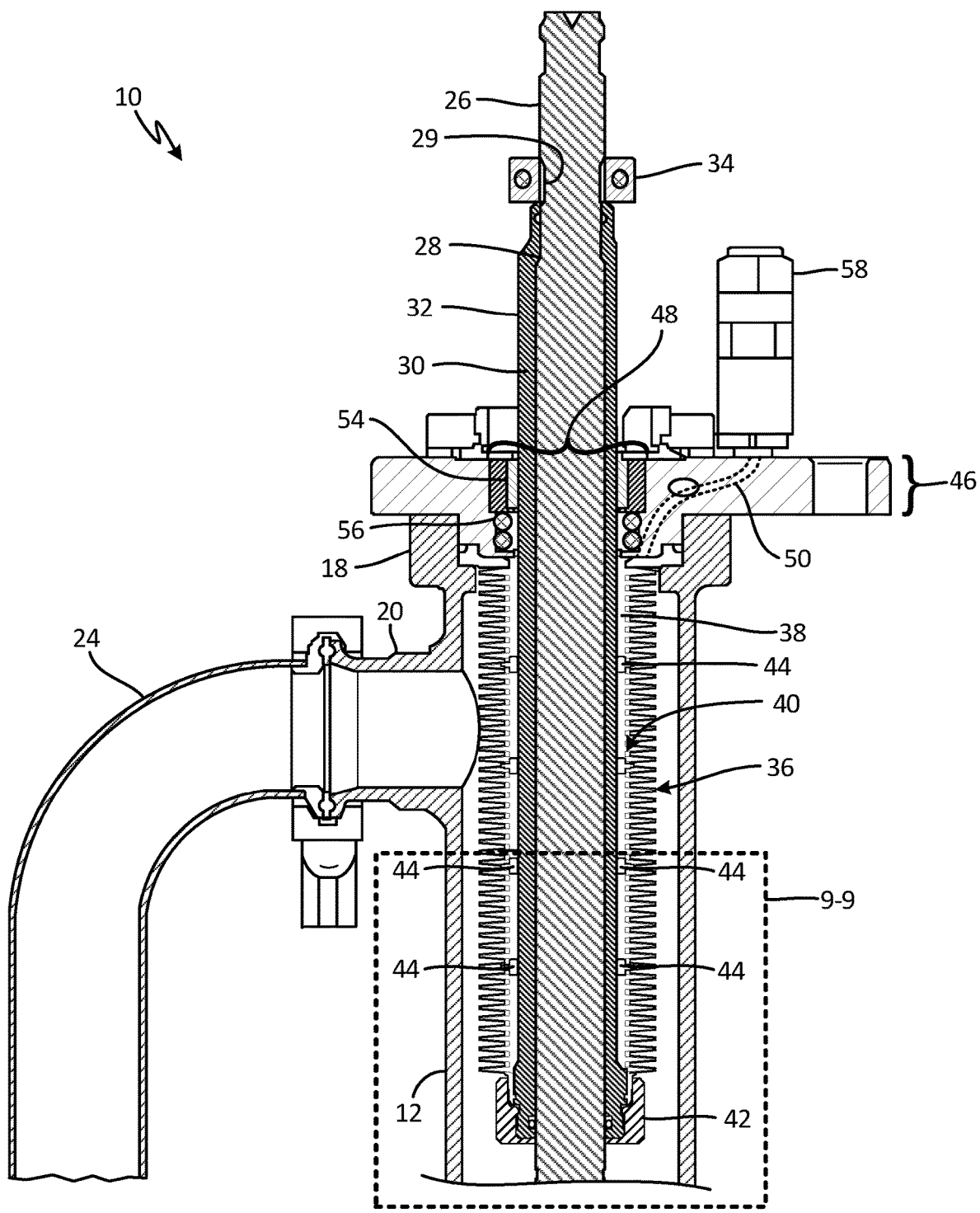
FIG. 2 is a partial cross-section view of the reciprocating pump with the bellows and bearings positioned in the bellows.

Pump (FIGS. 1 and 2)

FIGS. 1 and 2 are cross-section views of reciprocating pump 10. FIGS. 1 and 2 will be discussed together.

Reciprocating pump 10 includes housing 12, upper end 13 of housing 12 with bellows chamber 14, lower end 15 of housing 12 with displacement chamber 16, cylinder manifold 17, piston 18, throat seal 19, outlets 20A and 20B, inlets 22A and 22B, conduit 24, rod 26 with shoulder 28 and neck portion 29, sleeve 30, exterior 32 of sleeve 30, collar 34, bellows 36 with interior 38 and convolutions 40, nut 42, bearings 44, endcap 46 with opening 48 and passage 50, bearing 54, seal 56, and relief valve 58. FIG. 1 also includes flow F though reciprocating pump 10.

Reciprocating pump 10 includes a bellows circulation pump configured to pump paint and/or other fluids. While paint will be used in this disclosure as an exemplar, it should be understood that this is merely one example and that other fluids (such as water, oil, solvents, etc.) can be pumped instead of paint. In one non-limiting embodiment, reciprocating pump 10 is a 4-ball double acting pump such as any known 4-ball pump in the art. In one non-limiting embodiment, reciprocating pump 10 can include the pump described in "Sealed 4-Ball Lowers" repairs/parts manual which is incorporated by reference in its entirety. ("Sealed 4-Ball Lowers", Part No. 333022B, Revision B, Graco Inc., May 2016). In other non-limiting embodiments, reciprocating pump 10 can be a single-acting pump or other types of double-acting pumps with or without bellows.

Housing 12 is a solid, generally cylindrically shaped and enclosed tube. Housing 12 can include a material such as steel, aluminum, or other metal materials. Upper end 13 of housing 12 is an upper end of housing 12 located on or near an upper portion of housing 12. Bellows chamber 14 is a compartment within upper end 13 of housing 12 (as shown in FIG. 1). Lower end 15 of housing 12 is a lower end of housing 12 located on or near a lower portion of housing 12. Displacement chamber 16 forms a compartment within a lower part of housing 12 (as shown in FIG. 1). Displacement chamber 16 is configured for management and transfer of a working fluid within displacement chamber 16. Cylinder manifold 17 is a component of solid material configured for management and transfer of a working fluid within cylinder manifold 17. Piston 18 is a piston made of various assembled parts and is configured to pump a working fluid through displacement chamber 16. Throat seal 19 is a high pressure seal configured to prevent the transfer of fluid across throat seal 19. Outlet 20A is a hollow tube-shaped duct extending from upper end 13 of housing 12 and is configured for transferring a fluid out of housing 12, through outlet 20A, and into conduit 24. Outlet 20B is a hollow tube-shaped duct extending from housing 12 and is configured for transferring a fluid from housing 12 to outside of housing 12. Inlet 22A is a hollow tube-shaped duct extending from upper end 13 of housing 12 and is configured for transferring a fluid from outside of housing 12 and into bellows chamber 14 of housing 12. Inlet 22B is a hollow tube-shaped duct extending from housing 12 and is configured for transferring a fluid from conduit 24 and into housing 12. Conduit 24 is a hollow tube.

Rod 26 is an elongated solid piece of material. Near its upper end, rod 26 includes shoulder 28 formed by a step in rod 26. Rod 26 also include neck portion 29 which forms a portion of rod 26 with a diameter that is inset, or less than, a diameter of the remaining portion of rod 26. In one non-limiting embodiment, neck portion 29 is located above shoulder 28 (as shown in FIG. 2). Sleeve 30 is cylindrical or tubular piece of solid material. Exterior 32 is an exterior surface of sleeve 30. Collar 34 is a ring of solid material with a feature and/or means for attaching collar 34 to rod 26. Bellows 36 is a flexible sleeve with convolutions 40, which have alternating ridges and valleys along the surface of bellows 36 allowing bellows 36 to contract and expand within bellows chamber 14 of housing 12. In one non-limiting embodiment, a material of bellows 36 can be polytetrafluoroethylene, other types of tetrafluoroethylenes, or other materials with abrasion resistant characteristics. A cross-section shape of bellows 36 (not shown in FIG. 1 or 2) can include a circular or multi-lobed shape.

Nut 42 is a ring of solid material which is threaded. Bearings 44 are formed of an abrasion resistant material such as an ultra-high-molecular-weight polyethylene or other types of thermoplastics and/or polyethylenes. Endcap 46 is a disk of solid material with various openings or bores extending at least partially through endcap 46. Endcap 46 also includes opening 48 and passage 50. Opening 48 is a hole or passage through endcap 46 and extends in an upwards/downwards (up and down in FIG. 2) direction from a bottom of endcap 46 to a top of endcap 46. Passage 50 is a conduit for the transportation of a fluid. Bearing 54 is a ring of solid material with abrasion resistant surfaces. Seal 56 is a ring-shaped element with flexible sealing surfaces. Relief valve 58 is a valve for regulating the flow of fluids into and/or out of reciprocating pump 10.

Flow F is a path of fluid flow through reciprocating pump 10. In some non-limiting embodiments, the fluid of flow F can be a gas or liquid such as paint, oil, gas, water, hydraulic fluid, solvent, soap, or other industrial fluids.

Reciprocating pump 10 can be connected to and driven by a motor. In some non-limiting embodiments, reciprocating pump 10 can be connected to a pneumatic, hydraulic, or electric motor. Bellows chamber 14 and displacement chamber 16 of housing 12 are separated from each other by a portion of housing 12. Piston 18 is attached to a lower end of rod 26. Throat seal 19 forms a seal with rod 26 and is attached to rod 26 such that rod 26 is able to move up and down relative to throat seal 19. Throat seal 19 is also affixed to an upper end of lower end 15 of housing 12. Outlet 20A is fluidly connected to bellows chamber 14 of housing 12. Outlet 20A is fluidly connected to inlet 22B via conduit 24 which extends from outlet 20A to inlet 22B of housing 12 for transportation of a fluid from outlet 20A to inlet 22B. Inlet 22A is fluidly connected to bellows chamber 14 of housing 12. Inlet 22B is fluidly connected to displacement chamber 16 of housing 12.

Rod 26 extends through opening 48 of endcap 46 and into bellows chamber 14 of housing 12. A portion of rod 26 also extends partly into displacement chamber 16. Rod 26 with its lobed shape interacts with bearing 54 in endcap 46 to prevent relative rotation between rod 26 and endcap 46. Sleeve 30 is connected to rod 26 such that sleeve 30 surrounds a portion of rod 26. A portion of sleeve 30 is in contact with shoulder 28 of rod 26. Sleeve 30 is secured to rod 26 with a threaded fastener, bolt, clip, or any other form of mechanical fastener. Sleeve 30 mounts over rod 26 and rests on shoulder 28 of rod 26. Collar 34 is attached to rod 26 above sleeve 30 such that collar 34 secures sleeve 30 to rod 26 by holding collar 34 against shoulder 28 of rod 26. Collar 34 is also attached to rod 26 at neck portion 29 of rod 26. In some non-limiting embodiments, collar 34 is attached to rod 26 via threaded engagement, a fastener, an adhesive, or any other means of attachment known in the art. Rod 26 and sleeve 30 extend through bearing 54.

Bellows 36 is clamped to rod 26 and sleeve 30 by nut 42, such that nut 42 compresses and seals the lower end of bellows 36 to sleeve 30 and angular motion between sleeve 30 and bellows 36 is prevented. Bellows 36 is affixed between endcap 46 and upper end 13 of housing 12 such that relative angular motion between bellows 36 and housing 12 is prevented. Bearings 44 are disposed on sleeve 30 within bellows 36 and are each radially aligned with one of the convolutions of bellows 36.

Endcap 46 is disposed on and affixed to upper end 13 of housing 12. Passage 50, which extends through a portion of endcap 46, fluidly connects interior 38 of bellows 36 to relief valve 58. Bearing 54, which is disposed between endcap 46 and sleeve 30, is slidably engaged with sleeve 30 such that bearing 54 allows for rod 26 and sleeve 30 to move in and out of housing 12. Bearing 54 is fit into opening 48 of endcap 46. A shape of bearing 54 matches a shape of opening 48 in endcap 46. Seal 56 is disposed between endcap 46 and sleeve 30 (or rod 26) such that seal 56 prevents transmission of a fluid between rod 26 and endcap 46. Relief valve 58 is attached to endcap 46 and can be threadably engaged with endcap 46. Relief valve 58 is also fluidly connected to passage 50 in endcap 46.

In one non-limiting embodiment, reciprocating pump 10 is assembled by attaching the first end of bellows 36 to the first end of sleeve 30. The first end of bellows 36 is attached to the first end of sleeve 30 by securing bellows 36 to sleeve 30 with nut 42 such that nut 42 compresses and seals the first end of bellows 36 to sleeve 30. Sleeve 30 with bellows 36 is slid onto a portion of rod 26. Sleeve 30 is secured to rod 26. Sleeve 30 is slid onto rod 26 such that sleeve 30 comes into contact with shoulder 28 of rod 26. Collar 34 is attached to rod 26 above sleeve 30 such that collar 34 holds a portion of sleeve 30 against shoulder 28 of rod 26. Sleeve 30 is secured to rod 26 by attaching sleeve 30 to rod 26 with a threaded fastener, a bolt, or a clip. Sleeve 30 and rod 26 are inserted into housing 12 of reciprocating pump 10. Endcap 46 with sleeve 30 and rod 26 are secured to housing 12 of reciprocating pump 10 with at least one threaded fastener.

The second end of bellows 36 is attached to endcap 46 of housing 12 of reciprocating pump 10. Endcap 46 is secured to housing 12 of reciprocating pump 10 with a threaded fastener.

During operation of reciprocating pump 10, rod 26 with piston 18 is driven in a reciprocating manner up and down within housing 12. Rod 26 and sleeve 30 are mounted such that sleeve 30 moves with rod 26 relative to housing 12, and sleeve 30 remains stationary with respect to rod 26. Throat seal 19 is mounted in housing 12 such that throat seal 19 restricts a passage of fluid between bellows chamber 14 and displacement chamber 16. Bearing 54 and seal 56 provide a seal between rod 26 and endcap 46 as rod 26 reciprocates in and out of housing 12. The connection between bellows 36 and sleeve 30 creates a static seal capable of preventing the working fluid from entering interior 38 of bellows 36 via a connection point between sleeve 30 and bellows 36. Bellows 36 creates a non-sliding seal with sleeve 30 which prevents a working fluid of reciprocating pump 10 from exposure to outside air. As rod 26 is reciprocated into housing 12, bellows 36 expands and the length of bellows 36 increases. As rod 26 is reciprocated out of housing 12, bellows 36 contracts and the length of bellows 36 is reduced.

The use of sleeve 30 allows rod 26 to be a single piece improving strength and reliability of rod 26. The configuration of reciprocating pump 10 does not require complete disassembly of reciprocating pump 10 in order to replace bellows 36. Endcap 46 and collar 34 are removed from housing 12 and then sleeve 30 along with bellows 36 can be pulled out of the top of reciprocating pump 10.

Another advantage of sleeve 30 is that sleeve 30 and bellows 36 can be removed from reciprocating pump 10 without removing rod 26. For example, if bellows 36 fails in the field, a user can remove collar 34, remove endcap 46, and slide sleeve 30 and bellows 36 out of reciprocating pump 10. Bellows 36 is then replaced on sleeve 30 and the assembly is slid over rod 26 and into reciprocating pump 10. The rest of the procedure is reversed to assemble reciprocating pump 10. In this way, rod 26 is not required to be removed which translates into not touching the rod and piston seals which can compromise displacement chamber 16 of pump housing 12. This drastically simplifies replacement of bellows 36 in comparison to existing designs.

Lobed Sleeve (FIGS. 3-8)

Figure 3:
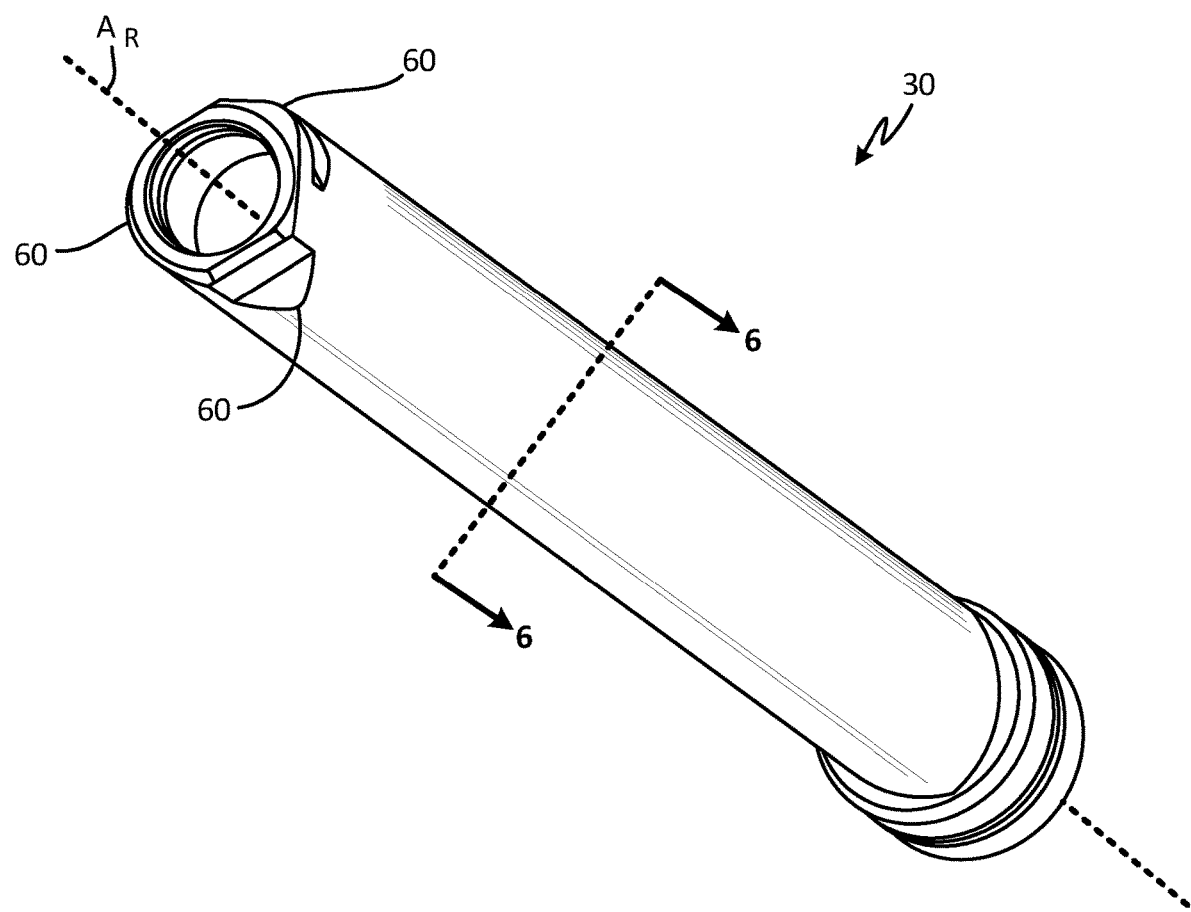
FIG. 3 is a perspective view of a sleeve from the reciprocating pump.

FIG. 3 is a perspective view of one embodiment of sleeve 30 in which sleeve 30 includes a lobed shape with three lobes 60 that are arranged around rod axis $A_R$. Lobes 60 can be formed during manufacturing of sleeve 30. Lobes 60 can be formed such that sleeve 30 and lobes 60 include a single piece of material, or lobes 60 can be attached or affixed to sleeve 30. A cross-section of sleeve 30 includes a lobed shape (see also FIGS. 6-8) which can include at least two lobes such as for example two, three, four, or more lobes.

Bearing 54, seal 56, and opening 48 of endcap 46 are configured to mate with the lobed shape of sleeve 30 cross-section. Bearing 54 is fit into opening 48 of endcap 46 and sleeve 30 is fit into bearing 54 such that endcap 46, bearing 54, and sleeve 30 are configured to prevent rotation of sleeve 30 relative to housing 12.

During operation or assembly of existing reciprocating pumps, the pump rod can rotate relative to the pump housing which can cause bellows 36 to deteriorate structurally and performance-wise. Existing solutions include the use of a D-shaped rod with a flat side and small corner radii which is difficult to manufacture and can be difficult to seal.

The lobed shape of sleeve 30 and corresponding bearing 54, seal 56, and opening 48 of endcap 46 provides rotational stops for preventing sleeve 30 from rotating relative to housing 12. Sleeve 30 engages with endcap 46 of housing 12 to inhibit sleeve 30 from turning during assembly and operation of reciprocating pump 10. The lobed shape of sleeve 30 can be easily ground into sleeve 30 with high precision and a good surface finish, both of which are requirements for reciprocating pump 10 and seal 56 to function properly. In particular, a tri-lobed shape gives sleeve 30 an inherent centering property because of the three lobes, while still maintaining a minimum corner radius of sleeve 30 that is acceptable for a backup seal in a reciprocating bellows pump such as seal 54 in reciprocating pump 10. The inherent centering property of sleeve 30 also extends to bellows 36 in that bellows 36 correspondingly is automatically centered relative to rod 26 and housing 12 due to the lobed shapes of rod 26 and sleeve 30.

An advantage of rotation prevention is that seal 56 forms a sealed interface with endcap 46 and with rod 26 to prevent fluid from exiting out of housing 12 via the interface between endcap 46 and rod 26. The lobed configuration of sleeve 30 also allows for better sealing between sleeve 30 and endcap 46 as compared to a D-shaped configuration or rod 26 and/or sleeve 30, as well as allows for more torque to be applied between rod 26 and housing 12 before damage occurs to any of the elements of reciprocating pump 10.

Figure 4:
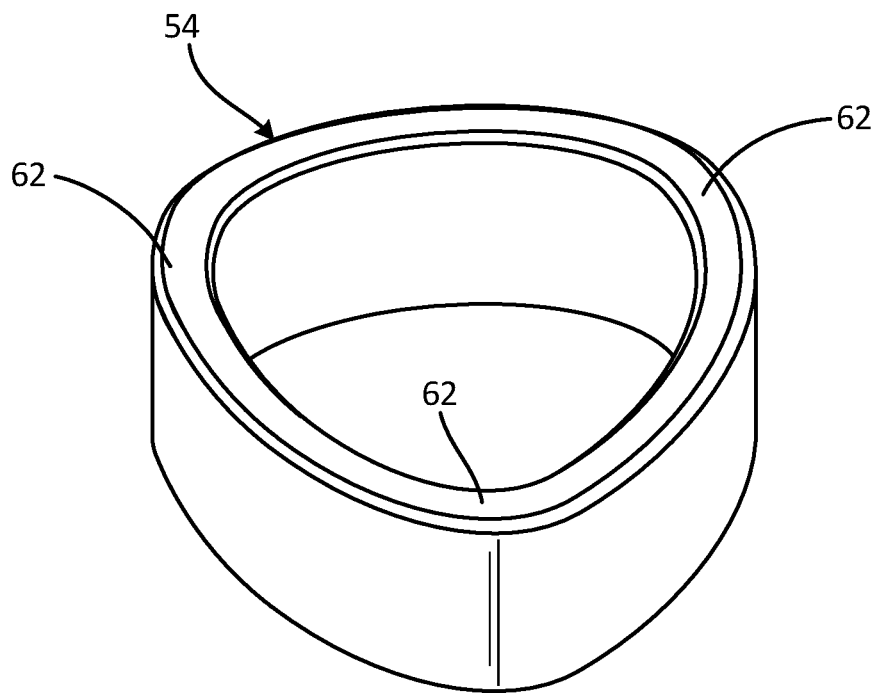
FIG. 4 is a perspective view of a bearing from the reciprocating pump.

FIG. 4 is a perspective view of bearing 54 from reciprocating pump 10. Bearing 54 is configured to accommodate the lobed shape of sleeve 30. In FIG. 4, bearing 54 is shown to include three lobes 62. In other non-limiting embodiments, bearing 54 can include a cross-section shape including more or less than three lobes 62 such as two, four, or more lobes.

Figure 5:
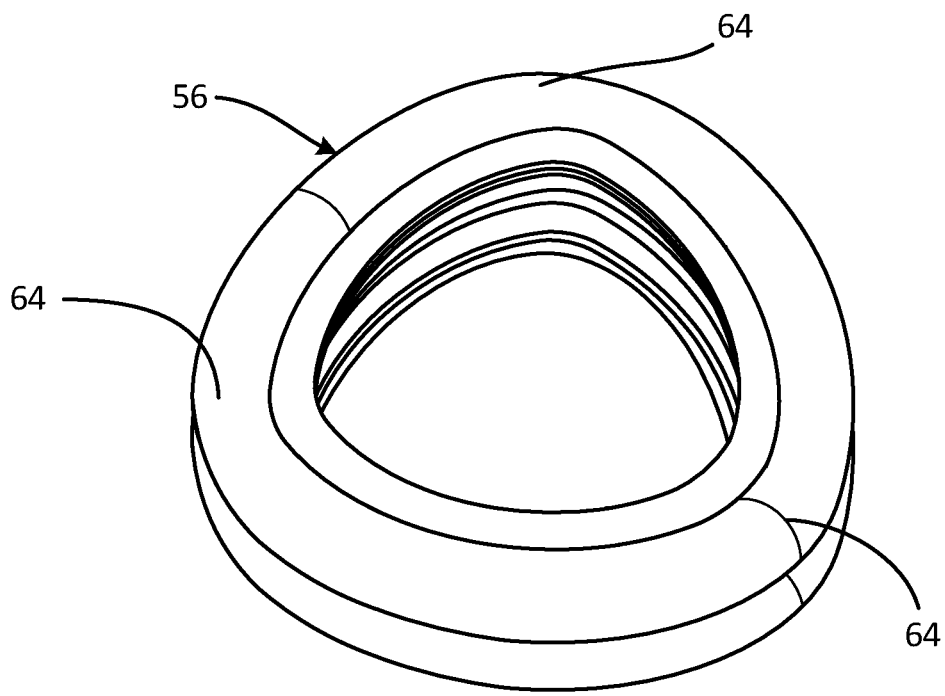
FIG. 5 is a perspective view of a seal from the reciprocating pump.

FIG. 5 is a perspective view of seal 56 from reciprocating pump 10. Seal 56 is configured to accommodate the lobed shape of sleeve 30. In FIG. 5, seal 56 is shown to include three lobes 64. In other non-limiting embodiments, seal 56 can include a cross-section shape including more or less than three lobes 64 such as two, four, or more lobes.

In existing pumps, rods and corresponding seals include small corner radii that make it difficult to provide a seal between rod and seal. The lobed shapes of sleeve 30 and seal 56 allow for seal 56 to conform to the rounded corner radii of lobes 60 of sleeve 30 and provide a more secure seal between sleeve 30 and seal 56 than existing seal configurations.

Figure 6:
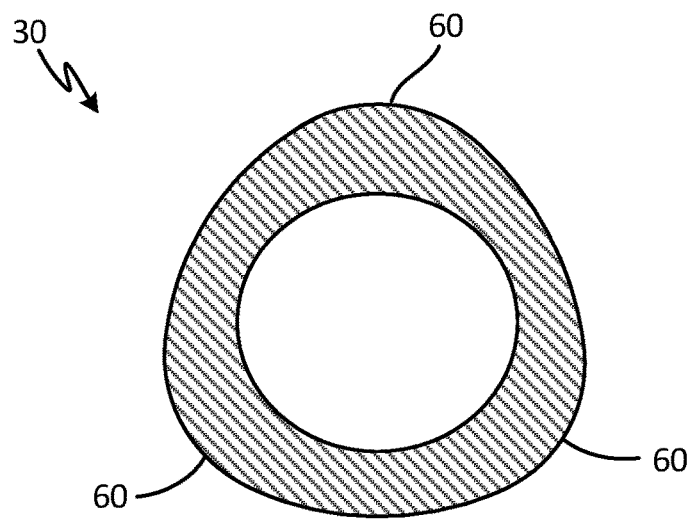
FIG. 6 is a cross-section view of a sleeve with a tri-lobed shape taken along 6-6 in FIG. 3.

FIG. 6 is a cross-section view of sleeve 30 taken along 6-6 in FIG. 3. Sleeve 30 includes a tri-lobed shape with three lobes 60. Lobes 60 are formed with sleeve 30 as sleeve 30 is machined or manufactured. In other non-limiting embodiments, lobes 60 can be attached to sleeve 30. As discussed above, the lobed shapes of sleeve 30 and seal 56 allow for seal 56 to conform to the rounded corner radii of lobes 60 of sleeve 30 and provide a secure seal between sleeve 30 and seal 56. Additionally, the tri-lobed shape of sleeve 30 provides an inherent centering property, while still maintaining a minimum corner radius acceptable for a backup seal such as seal 54 in reciprocating pump 10.

Figures 7, 8:
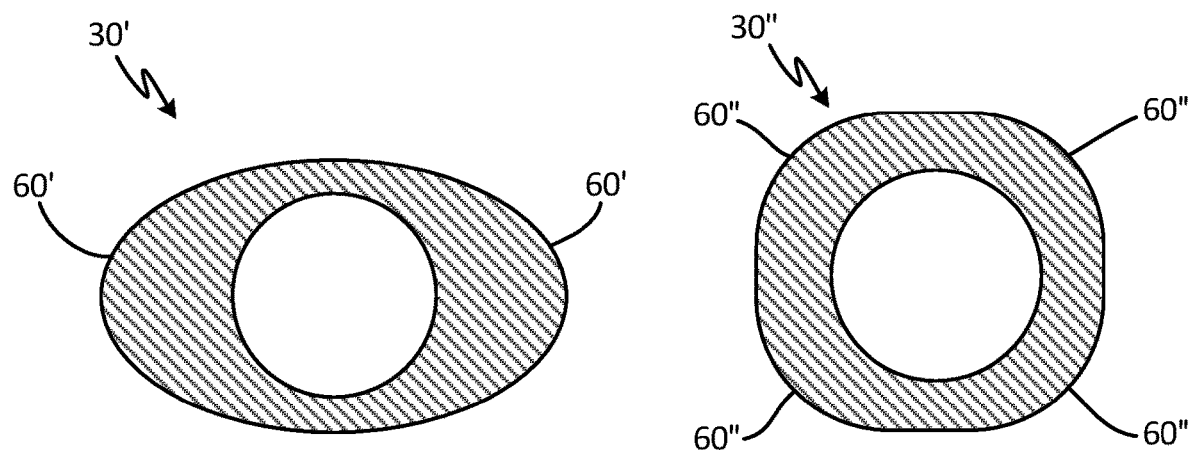
FIG. 7 is a cross-section view of a sleeve with a bi-lobed shape.
FIG. 8 is a cross-section view of a sleeve with a quad-lobed shape.

FIG. 7 is a cross-section view of sleeve 30'. Sleeve 30' includes a bi-lobed shape with two lobes 60'. The bi-lobed configuration of sleeve 30' engages with endcap 46 of housing 12 to prohibit sleeve 30' and rod 26 from turning during assembly and operation of reciprocating pump 10.

FIG. 8 is a cross-section view of sleeve 30". Sleeve 30" includes a quad-lobed shape with four lobes 60". The quad-lobed configuration of sleeve 30" engages with endcap 46 of housing 12 to prohibit sleeve 30″ and rod 26 from turning during assembly and operation of reciprocating pump 10.

Figure 9:
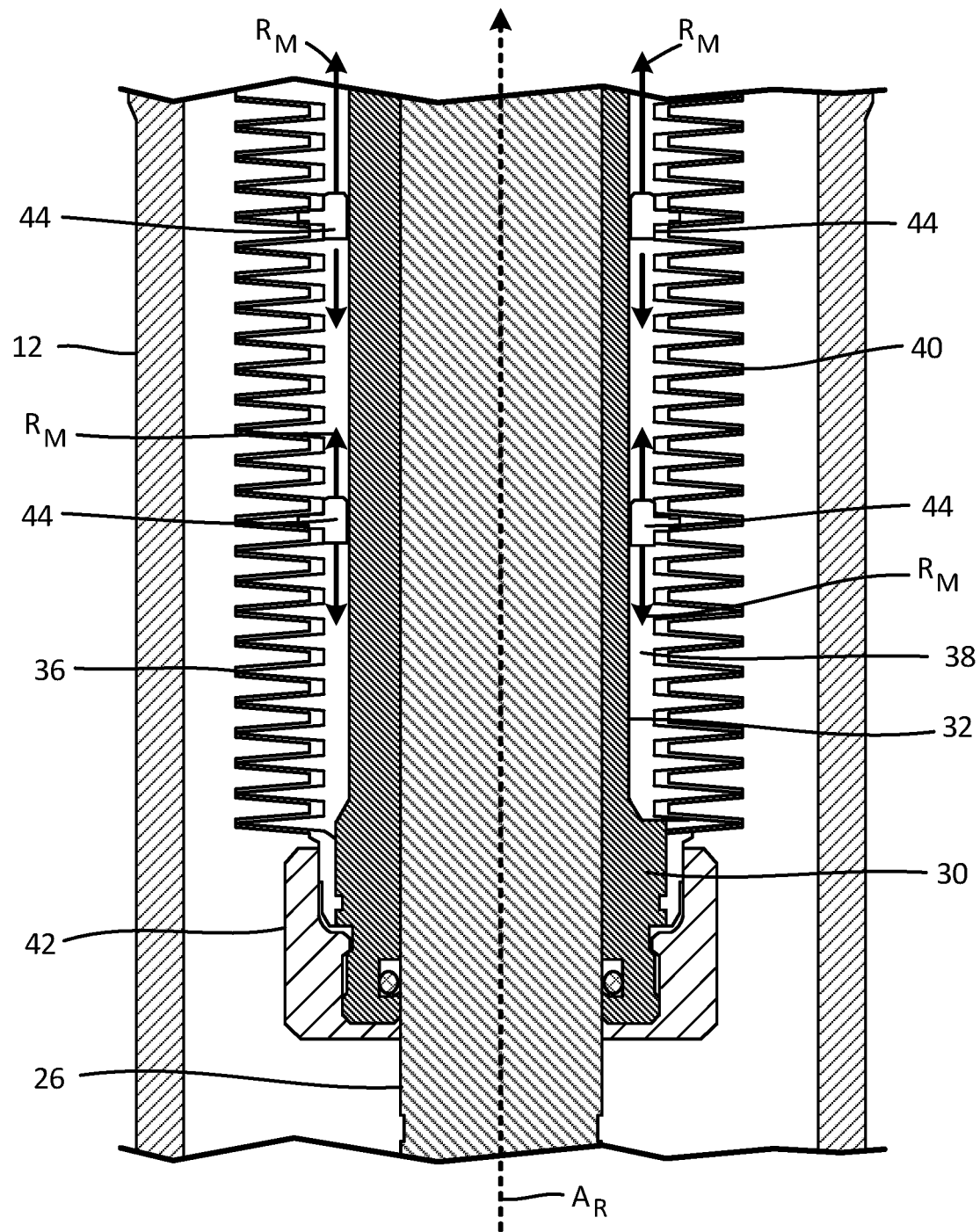
FIG. 9 is a cut-out cross-section view of the reciprocating pump with bearings positioned in the bellows, taken along 9-9 in FIG. 2.
Figure 10A:
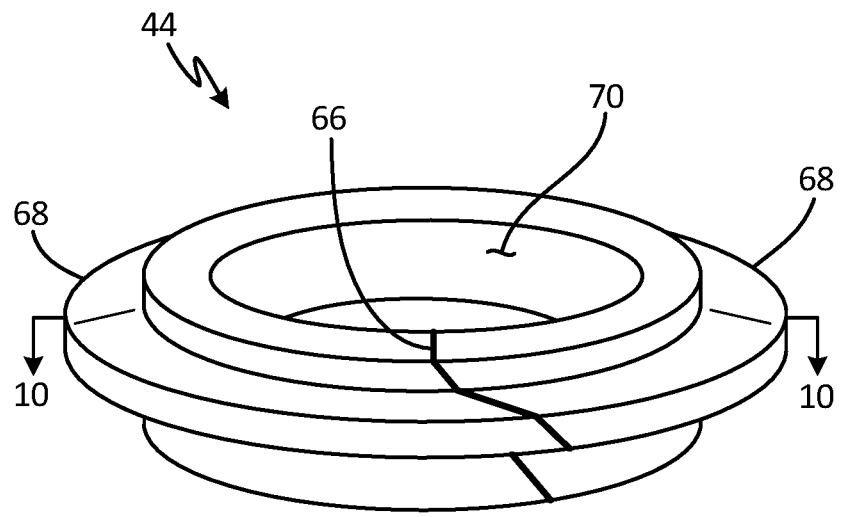
FIG. 10A is a perspective view of a bearing.
Figure 10B:
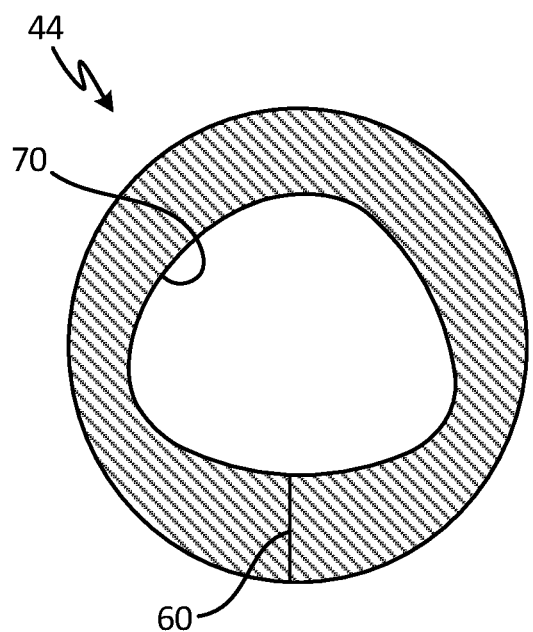
FIG. 10B is a cross-section view of the bearing taken along 10-10 in FIG. 10A.

Bearings (FIGS. 9, 10A, and 10B)

FIG. 9 is a cut-out cross-section view of reciprocating pump 10 taken along 9-9 in FIG. 2. FIG. 9 shows housing 12, rod 26, sleeve 30, exterior 32 of sleeve 30, bellows 36, interior 38 of bellows 36, convolutions 40, nut 42, and bearings 44.

Bearings 44 are disposed within interior 38 of bellows 36 between bellows 36 and sleeve 30. Bearings 44 extend around exterior 32 of sleeve 30 and are radially aligned with convolutions 40 of bellows 36, for example aligned along a radial direction from rod axis $A_R$. Bearings 44 are slidably engaged with sleeve 30 such that sleeve 30 is configured to move in an axial direction relative to bearings 44, shown by arrows $R_M$, as bellows 36 moves relative to sleeve 30. For example, as bellows 36 contracts and expands, each of convolutions 40 moves in an axial direction relative to rod 26 and sleeve 30. With each of bearings 44 being radially aligned with one of convolutions 40, each of bearings 44 moves with convolutions 40 as bellows 36 contracts and expands.

Bearings 44 are placed to prevent bellows 36 from contacting rod 26 during compression and expansion of bellows 36. During operation of reciprocating pump 10, bearings 44 ride up and down on rod 26 to support bellows 36 and keep bellows 36 from squirming or disfiguring. Preventing bellows 36 from squirming or disfiguring protects bellows 36 from coming into contact with sleeve 30 which can cause bellows 36 to become damaged. Preventing damage to bellows 36 prevents the working fluid from passing into interior 38 of bellows 36 and causing failure of reciprocating pump 10.

The number of bearings 44 in reciprocating pump 10 can include one or more bearings. In one non-limiting embodiment, bearings 44 can be generally evenly spaced from each other along interior 38 of bellows 36. In other non-limiting embodiments, bearings 44 can be disposed in uniform or non-uniform spacing patterns to account for the length and operational behavior of bellows 36 and reciprocating pump 10.

FIG. 10A is a perspective view of an embodiment of bearing 44 that is configured to mate with a tri-lobed embodiment of sleeve 30. FIG. 10B is a cross-section view of bearing 44 taken along 10-10 in FIG. 10A. FIGS. 10A and 10B will be discussed together.

Bearing 44 is a snap-ring and includes slit 66, ridge 68, and interior surface 70. Slit 66 includes a point of discontinuity in bearing 44. Slit 66 includes a slanted cut along bearing 44. In other non-limiting embodiments, slit 66 can include shapes other than a slanted line such as a curved, jagged, saw-tooth, or another geometric-shaped interface. Ridge 68 includes a pointed face of bearing 44 which extends generally radially outwards from bearing 44. Ridge 68 can be formed as a part of bearing 44 or can be attached to bearing 44.

Interior surface 70 of bearing 44 is an inside face of bearing 44 with a cross-section shape configured to accommodate the lobed shape of sleeve 30. The cross-section shape of interior surface 70 of bearing 44 includes a tri-lobed configuration. In other non-limiting embodiments, the cross-section shape of interior surface 70 of bearing 44 can include a lobed shape with two, four, or more lobes. In yet other non-limiting embodiments, the cross-section shape of interior surface 70 of bearing 44 can include any shape other than a lobed shape such as for example a circular shape. In such a non-limiting embodiment of interior surface 70, three points of contact are formed on the circular interior surface 70 (or internal diameter) of bearing 44 with the tri-lobed shape of sleeve 30 to maintain axial position of bearing 44 without adapting the shape of interior surface 70 to be lobed. Such a configuration would force bearing 44 to be co-axial with rod 26 and/or sleeve 30.

Slit 66 allows bearing 44 to be contorted during installation so as to allow bearing 44 to be inserted into bellows 36. The interface at slit 66 allows a portion of bearing 44 to be split and wound inwardly. During installation of bearing 44 into bellows 36, a diameter of bearing 44 is decreased by winding bearing 44 into itself. As bearing 44 is wound inwardly, an effective diameter of bearing 44 is decreased. With the decreased diameter, bearing 44 is inserted into bellows 36. Once aligned with one of convolutions 40 of bellows 36, bearing 44 is un-wound increasing the effective diameter of bearing 44. As the diameter of bearing 44 is increased, bearing 44 is snapped into one of convolutions 40 of bellows 36. As bearing 44 snaps into one of the convolutions 40 of bellows 36, ridge 68 is inserted into one of convolutions 40 of bellows 36. With ridge 68 inserted into one of convolutions 40 of bellows 36, bearing 44 is held in place relative to the one of convolutions 40 of bellows 36 thereby preventing relative axial displacement between bearing 44 and convolution 40. As bellows 36 expand and contracts along rod 26 and sleeve 30, bearing 44 moves along with the one of convolutions 40 of bellows 36 to prevent bellows 36 from coming into contact with sleeve 30.

In another non-limiting embodiment, bearing 44 can interface with bellows 36 by way of dedicated receiver grooves positioned within the convolutions of bellows 36. The dedicated receiver grooves can include a sleeved collar including a groove for receiving bearing 44. The dedicated receiver grooves can be placed within and along the convolutions 40 of bellows 36 prior to installation of bearing 44 in bellows 36.

Relief Valve (FIGS. 11, 12, 13A, and 13B)

Figure 11:
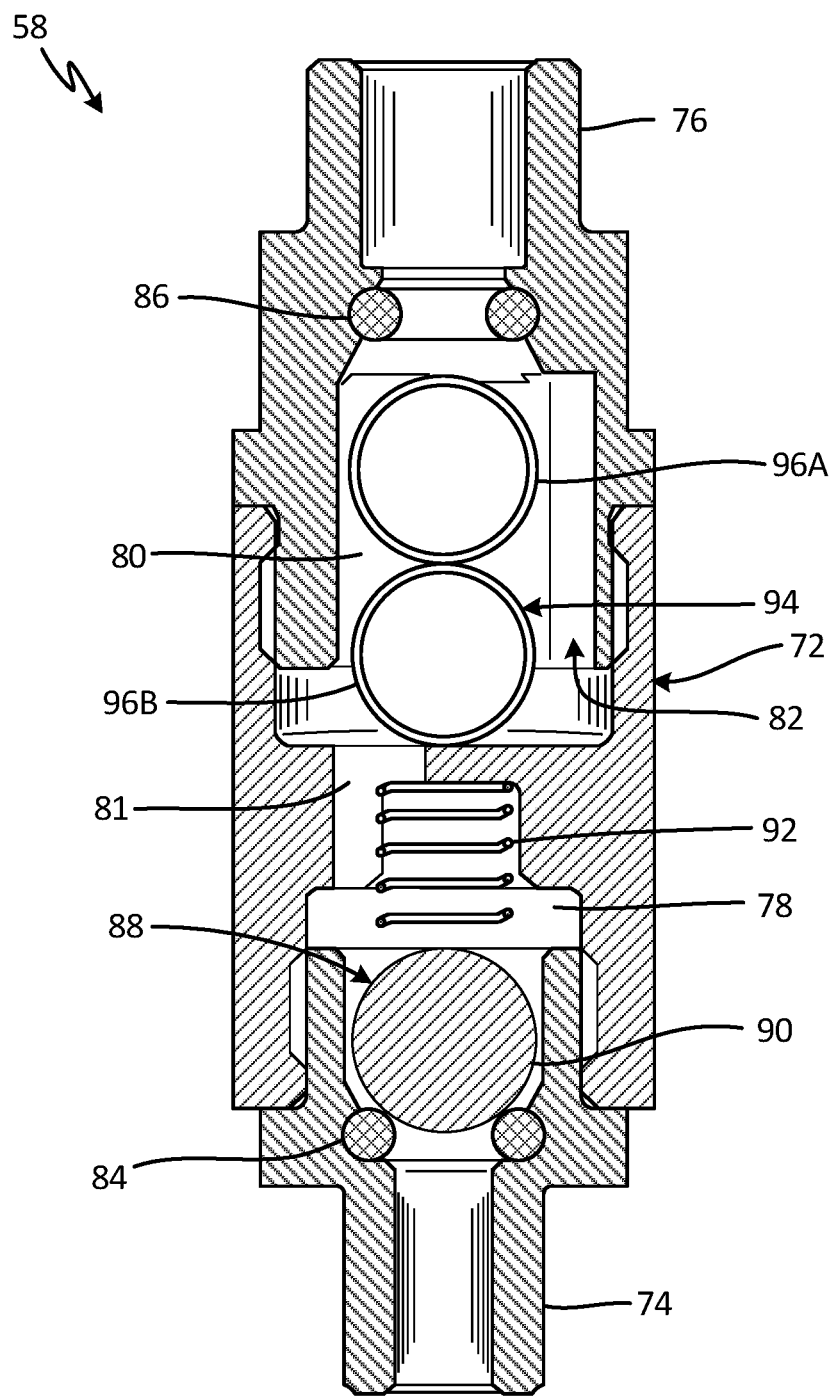
FIG. 11 is a cross-section view of the relief valve.
Figure 12:
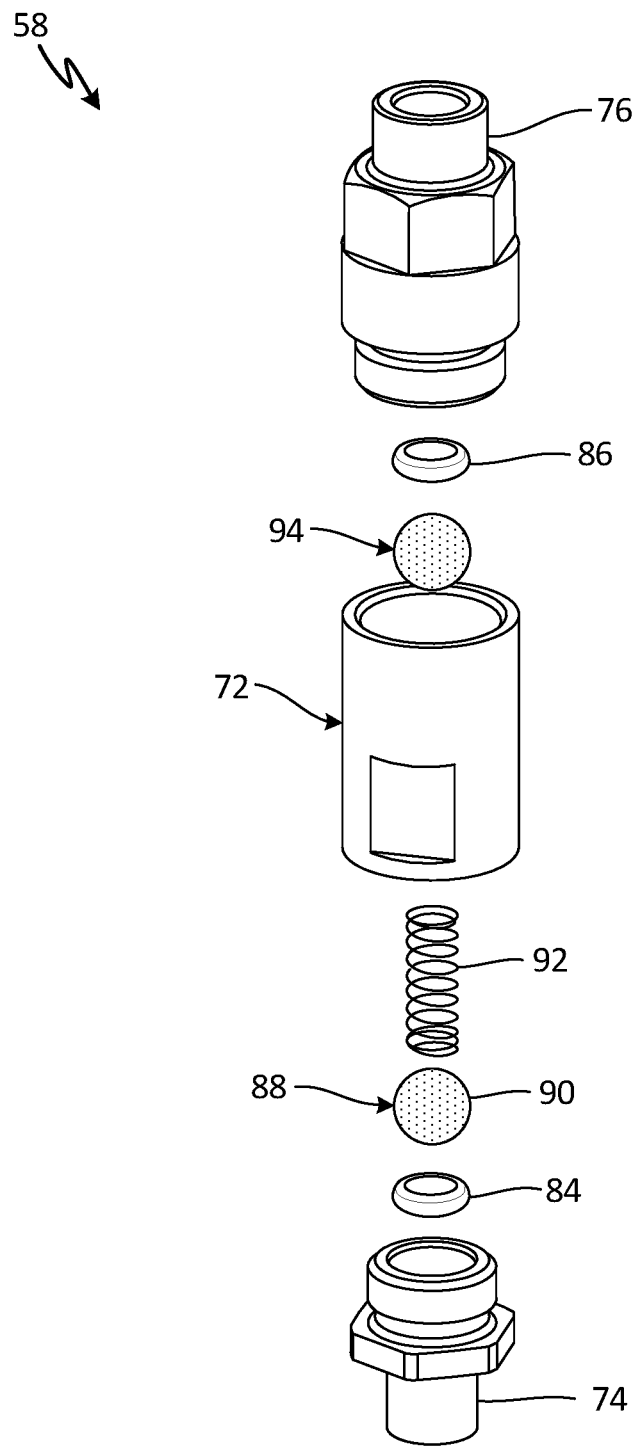
FIG. 12 is an exploded view of the relief valve.

FIG. 11 is a cross-section view of relief valve 58. FIG. 12 is an exploded view of relief valve 58. FIGS. 11 and 12 will be discussed together. Relief valve 58 is discussed herein as being used with reciprocating pump 10, however in other non-limiting embodiments relief valve 58 can be used with other types of pumps such as diaphragm pumps or any other statically sealed assemblies.

Relief valve 58 includes housing 72, inlet 74, outlet 76, first chamber 78, second chamber 80, passage 81, channels 82, first valve seat 84, second valve seat 86, first valve element 88 with spring-loaded check valve element 90 and spring 92, and second valve element 94 with balls 96A and 96B.

Housing 72 is a generally cylindrical body of material containing first chamber 78, second chamber 80, inlet 74, and outlet 76. Inlet 74 and outlet 76 are tubular portions of solid material extending outwards from housing 72. Both inlet 74 and outlet 76 can include threading or other features for fastening or attachment. First chamber 78 and second chamber 80 are compartments within housing 72 for the transport of fluids such as a liquid or gas. Passage 81 is a fluidic passage extending through a portion of housing 72. Channels 82 are slits, cuts, or passages along and in the wall of second chamber 80. In this embodiment, first valve seat 84 and second valve seat 86 are O-rings that provide sealing surfaces. First valve element 88 includes spring-loaded check valve element 90 and spring 92. Spring-loaded check valve element 90 is a ball valve element that is connected to spring 92. Second valve element 94 includes balls 96A and 96B of a buoyant material such as plastic. In other non-limiting embodiments, second valve element 94 can include one or more hollow balls, ellipsoids, cones, cylinders, or other shapes.

Inlet 74 of relief valve 58 is attached to endcap 46 of housing 12 and is fluidly connected to interior 38 of bellows 36 via passage 50 in endcap 46. First chamber 78 contains first valve element 88 and first valve seat 84 and is fluidly connected to inlet 74 and to second chamber 80. Second chamber 80 contains second valve element 94 and second valve seat 86 and is fluidly connected to outlet 76 and to first chamber 78. Passage 81 fluidly connects first chamber 78 and second chamber 80. Channels 82 extend along a portion of the wall of second chamber 80. First valve seat 84 is positioned at an end of first chamber 78 that is opposite from second chamber 80 and is partly disposed in housing 72 between inlet 74 and first valve element 88. First valve seat 84 includes a shape configured to create a seal with first valve element 88 when first valve element 88 comes into contact with first valve seat 84.

Second valve seat 86 is positioned at an end of second chamber 80 that is opposite from first chamber 78 and is partly disposed in housing 72 between outlet 76 and second valve element 94. Second valve seat 86 includes a shape configured to create a seal with second valve element 94 when second valve element 94 comes into contact with second valve seat 86. Spring-loaded check valve element 90 is disposed in first chamber 78. Spring 92 of first valve element 88 biases spring-loaded check valve element 90 against first valve seat 84 and is connected to housing 72 at an end of first chamber 78 opposite of first valve seat 84. Second valve element 94 is disposed in and contained within second chamber 80 such that second valve element 94 is able to move freely within second chamber 80. Second valve element 94 is centered in second chamber 80 by housing 72.

In existing pumps, bellows are utilized to create a non-sliding seal to prevent exposure of a working fluid to outside air. To prevent unwanted fluid leaks, a backup seal can be used to seal the pump rod enclosed by the bellows. However, the backup seal seals the back of the bellows and does not allow the bellows to breathe as the bellows expands and contracts. This can cause cycle fatigue and deformation in the bellows. If a simple breather hole with a screen or mesh were put between the bellows and backup seal, air can ingress through the hole and working fluid can egress through the hole and the pump would no longer continue to operate in the event of a bellows rupture.

First valve element 88 with spring-loaded check valve element 90 is designed to allow fluid to leave interior 38 of bellows 36 and travel past spring-loaded check valve element 90 while also preventing fluid from entering into interior 38 of bellows 36 through relief valve 58. First valve element 88 with spring-loaded check valve element 90 is also designed to let any pressure out of bellows 36 that is substantially above atmospheric pressure to ensure interior 38 of bellows 36 does not get pressurized during the normal cycling of reciprocating pump 10. If the pressure in bellows chamber 14 is below atmospheric pressure, first valve element 88 keeps the pump operating after bellows 36 has ruptured by maintaining the position of first valve element 88 against first valve seat 84. Interior 38 of bellows 36 can fall below atmospheric pressure during a failure of bellows 36 due to inlet suction of the pump.

Second valve element 94 is used to allow low viscosity fluids such as air to escape from relief valve 58, but in the case of the working liquid leaving reciprocating pump 10 and entering relief valve 58, second valve element 94 floats in the working liquid pressing second valve element 94 against second valve seat 86. Liquid flow from relief valve 58 is thereby shut off and fluid is not allowed to leave interior 38 of bellows 36. However, since second valve element 94 is only lifted by a fluid that is denser then second valve element 94, second valve element 94 only checks or closes when there is a liquid present in second chamber 80. This configuration allows spring-loaded check valve element 90 in first chamber 78 to let air out of interior 38 of bellows 36, and in the event of a failure of bellows 36, second valve element 94 prevents the working liquid from escaping relief valve 58.

In one non-limiting embodiment, second valve element 94 of relief valve 58 can include two hollow plastic balls such as balls 96A and 96B. In other non-limiting embodiments, the quantity, size, shape, and material of second valve element 94 can be selected to provide for desired buoyancy and flow characteristics. One of the aspects of hollow plastic balls is that by design, they are very light so they can float and seal relief valve 58 when liquid is present which may cause issues when air is being bled from bellows 36 via first valve element 88 of relief valve 58. The escaping air, if moving fast enough, can lift balls 96A and 96B and cause balls 96A and 96B to seal against second valve seat 86, preventing the air from bleeding off. To address the issue of bleed air potentially causing second valve element 94 lifting and coming into contact with second valve seat 86, channels 82 in housing 72 give air a path around second valve element 94 while still keeping second valve element 94 centered in housing 72. Channels 82 provide passages for air to pass by and/or around second valve element 94.

During a failure or rupture of bellows 36, the configuration of relief valve 58 prevents air from entering into reciprocating pump 10 and prevents the working fluid from exiting reciprocating pump 10. Relief valve 58 prevents the pressure inside interior 38 of bellows 36 from becoming excessively high during normal operation of reciprocating pump 10, prevents air from being ingested into reciprocating pump 10 if bellows 36 is ruptured and the pressure inside bellows chamber 14 is below atmospheric pressure, and prevents liquid from being pushed out of reciprocating pump 10 if the pressure in interior 38 of bellows 36 or bellows chamber 14 of housing 12 of reciprocating pump 10 is above atmospheric pressure.

Figure 13A:
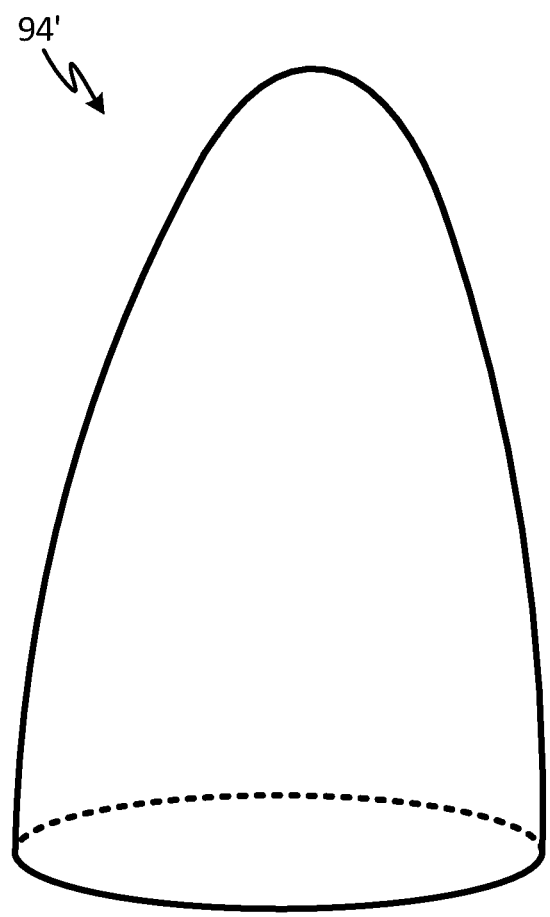
FIG. 13A is a perspective view of a conical valve element of the relief valve.
Figure 13B:
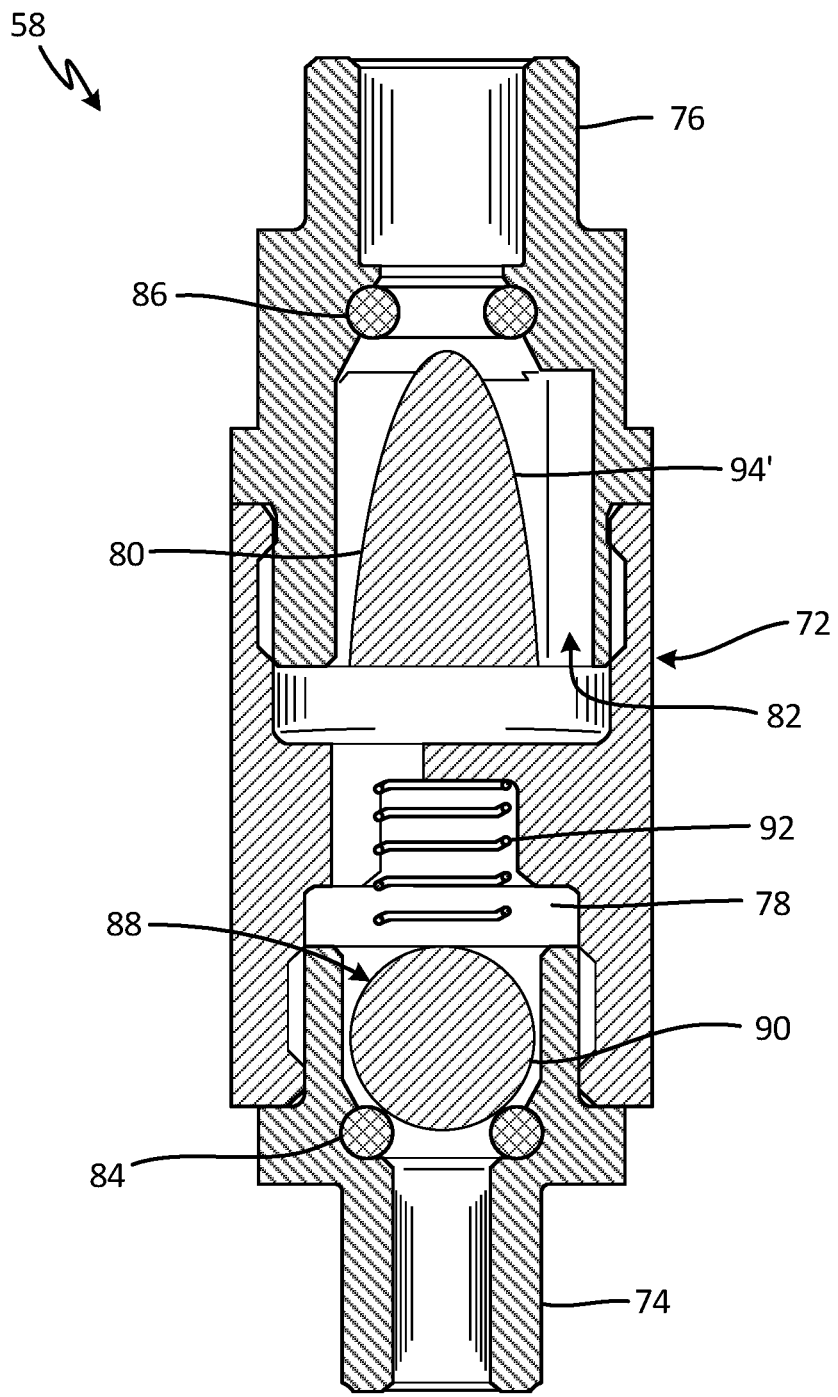
FIG. 13B is a cross-section view of the relief valve with the conical valve element.

FIG. 13A is a perspective view of an alternative embodiment featuring second valve element 94' of relief valve 58. FIG. 13B is a cross-section view of relief valve 58 with second valve element 94'. FIGS. 13A and 13B will be discussed together.

Second valve element 94' includes a conical shape and a buoyant material. The top end, as shown in FIG. 13A, includes a shape configured to engage with second valve seat 86 creating a seal preventing the transfer of liquid from second chamber 80 and out of relief valve 58. Similar to second valve element 94 discussed with respect to FIGS. 11 and 12, second valve element 94' combined with channels 82 in housing 72 allow for air to pass by and/or around second valve element 94' which prevents the transfer of air through second chamber 80 from causing second valve element 94' from closing relief valve 58 due to air flowing out of relief valve 58.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve for a reciprocating pump, the valve comprising:
a housing with an inlet and an outlet, the housing comprising a sidewall and a projection extending laterally inward from the sidewall and into a flow path between the inlet and the outlet;
a first chamber within the housing, the first chamber having a first valve seat and disposed downstream of and fluidly connected to the inlet;
a second chamber within the housing and disposed downstream of the first chamber, the second chamber having a second valve seat and being fluidly connected to the outlet and the first chamber;
a spring within the first chamber, the spring braced against the projection;
a first valve element disposed in the first chamber opposite the first valve seat, wherein the first valve element comprises a check valve element; and
a second valve element disposed in the second chamber, wherein the second valve element comprises a buoyant material, the second valve element further comprising a first ball and a second ball,
wherein the spring biases the first valve element toward the first valve seat.

2. The valve of claim 1, further comprising a channel formed in a wall of the second chamber.

3. The valve of claim 2, wherein the channel is configured to permit a gas to bypass the second valve element.

4. The valve of claim 1, wherein the second valve element is hollow.

5. The valve of claim 1, wherein the second valve element comprises a plastic material.

6. The valve of claim 1, wherein the second valve element is configured to bias against the second valve seat when there is a liquid present in the second chamber.

7. The valve of claim 1, wherein the inlet is fluidly connected to an interior of a bellows of a reciprocating pump.

8. The valve of claim 1, further comprising a passage formed by the housing, wherein the passage directly fluidly connects the first chamber and the second chamber.

9. The valve of claim 1, wherein the second valve seat is positioned at an end of the second chamber opposite the first chamber.

10. The valve of claim 1, wherein the second valve element is centered in the second chamber by the housing.

11. The valve of claim 1, wherein the second valve element and the second chamber are sized such that the second valve element is able to move freely within the second chamber.

12. A valve for a reciprocating pump, the valve comprising:
a housing with an inlet and an outlet;
a first chamber within the housing, the first chamber having a first valve seat and disposed downstream of and fluidly connected to the inlet;
a second chamber within the housing and disposed downstream of the first chamber, the second chamber having a second valve seat and being fluidly connected to the outlet and the first chamber;
a spring within the first chamber;
a first valve element disposed in the first chamber opposite the first valve seat, wherein the first valve element comprises a check valve element; and
a second valve element disposed in the second chamber and comprising a buoyant material, the second valve element normally disengaged from the second valve seat and configured such that fluid within the second chamber urges second valve element into engagement with the second valve seat;
wherein the spring biases the first valve element toward the first valve seat.

* * * * *